(12) United States Patent
Seibel et al.

(10) Patent No.: US 7,330,850 B1
(45) Date of Patent: *Feb. 12, 2008

(54) TEXT MINING SYSTEM FOR WEB-BASED BUSINESS INTELLIGENCE APPLIED TO WEB SITE SERVER LOGS

(75) Inventors: John C. Seibel, Austin, TX (US); Yu Feng, Maplewood, NJ (US); Robert L. Foster, Austin, TX (US)

(73) Assignee: ReachForce, Inc., Austin, TX (US)

( * ) Notice: Subject to any disclaimer, the term of this patent is extended or adjusted under 35 U.S.C. 154(b) by 229 days.

This patent is subject to a terminal disclaimer.

(21) Appl. No.: 09/971,334

(22) Filed: Oct. 4, 2001

Related U.S. Application Data

(60) Provisional application No. 60/238,094, filed on Oct. 4, 2000.

(51) Int. Cl.
*G06F 17/30* (2006.01)

(52) U.S. Cl. .................. 707/4; 707/6; 707/7; 707/10; 709/203; 709/217

(58) Field of Classification Search ............. 707/1–10, 707/100–104.1, 200–206; 709/216, 217–219, 709/203, 204; 705/10, 14, 35
See application file for complete search history.

(56) References Cited

U.S. PATENT DOCUMENTS

| | | | |
|---|---|---|---|
| 4,914,586 A | 4/1990 | Swinehart et al. ........... 364/200 |
| 5,619,648 A | 4/1997 | Canale et al. ........... 395/200.01 |
| 5,630,121 A | 5/1997 | Braden-Harder et al. ... 395/604 |
| 5,649,114 A | 7/1997 | Deaton et al. .............. 395/214 |
| 5,659,469 A | 8/1997 | Deaton et al. .............. 395/214 |
| 5,742,816 A | 4/1998 | Barr et al. .................. 395/615 |
| 5,787,422 A * | 7/1998 | Tukey et al. ................... 707/5 |
| 5,809,481 A | 9/1998 | Baron et al. .................. 705/14 |
| 5,897,622 A | 4/1999 | Blinn et al. ................... 705/26 |
| 5,924,068 A | 7/1999 | Richard et al. ............. 704/260 |
| 5,924,105 A | 7/1999 | Punch, III et al. .......... 707/513 |
| 5,931,907 A | 8/1999 | Davies et al. ............... 709/218 |
| 5,974,398 A | 10/1999 | Hanson et al. ................ 705/14 |
| 5,986,690 A | 11/1999 | Hendricks ...................... 348/7 |
| 5,987,247 A | 11/1999 | Lau ............................ 395/702 |

(Continued)

FOREIGN PATENT DOCUMENTS

EP      1118952      7/2001

(Continued)

OTHER PUBLICATIONS

U.S. Appl. No. 60/200,338.*

(Continued)

*Primary Examiner*—Jean Bolte Fleurantin

(57) ABSTRACT

A text mining system for collecting business intelligence about a client, as well as for identifying prospective customers of the client, for use in a lead generation system accessible by the client via the Internet. The text mining system has various components, including a data acquisition process that extracts textual data from Internet web sites, including their logs, content, processes, and transactions. The system compares log data to content and process data, and relates the results of the comparison to transaction data. This permits the system to provide aggregate cluster data representing statistics useful for customer lead generation.

15 Claims, 9 Drawing Sheets

U.S. PATENT DOCUMENTS

| | | | |
|---|---|---|---|
| 5,999,927 A * | 12/1999 | Tukey et al. | 707/5 |
| 6,006,242 A | 12/1999 | Poole et al. | 707/531 |
| 6,026,433 A | 2/2000 | D'Arlach et al. | 709/217 |
| 6,029,141 A | 2/2000 | Bezos et al. | 705/27 |
| 6,029,164 A | 2/2000 | Birrell et al. | 707/3 |
| 6,029,174 A | 2/2000 | Sprenger et al. | 707/103 |
| 6,029,195 A | 2/2000 | Herz | 709/219 |
| 6,034,970 A | 3/2000 | Levac et al. | 370/466 |
| 6,055,510 A | 4/2000 | Henrick et al. | 705/14 |
| 6,058,398 A | 5/2000 | Lee | 707/104 |
| 6,058,418 A | 5/2000 | Kobata | 709/221 |
| 6,078,891 A | 6/2000 | Riordan et al. | 705/10 |
| 6,105,055 A | 8/2000 | Pizano et al. | 709/204 |
| 6,119,101 A | 9/2000 | Peckover | 705/26 |
| 6,134,548 A | 10/2000 | Gottsman et al. | 707/5 |
| 6,145,003 A | 11/2000 | Sanu et al. | 709/225 |
| 6,148,289 A | 11/2000 | Virdy | 705/1 |
| 6,151,582 A | 11/2000 | Huang et al. | 705/8 |
| 6,151,601 A * | 11/2000 | Papierniak et al. | 707/10 |
| 6,154,766 A | 11/2000 | Yost et al. | 709/201 |
| 6,170,011 B1 | 1/2001 | Macleod Beck et al. | 709/224 |
| 6,199,081 B1 | 3/2001 | Meyerzon et al. | 707/513 |
| 6,202,210 B1 | 3/2001 | Ludtke | 725/20 |
| 6,205,432 B1 | 3/2001 | Gabbard et al. | 705/14 |
| 6,212,178 B1 | 4/2001 | Beck et al. | 370/352 |
| 6,226,623 B1 * | 5/2001 | Schein et al. | 705/35 |
| 6,233,575 B1 * | 5/2001 | Agrawal et al. | 707/6 |
| 6,236,975 B1 | 5/2001 | Boe et al. | 705/7 |
| 6,240,411 B1 * | 5/2001 | Thearling | 707/5 |
| 6,249,764 B1 | 6/2001 | Kamae et al. | 704/270.1 |
| 6,256,623 B1 | 7/2001 | Jones | 707/3 |
| 6,262,987 B1 | 7/2001 | Mogul | 370/400 |
| 6,263,334 B1 * | 7/2001 | Fayyad et al. | 707/5 |
| 6,282,548 B1 | 8/2001 | Burner et al. | 707/104 |
| 6,289,342 B1 | 9/2001 | Lawrence et al. | 707/7 |
| 6,332,154 B2 | 12/2001 | Beck et al. | 709/204 |
| 6,338,066 B1 | 1/2002 | Martin et al. | 707/10 |
| 6,345,288 B1 | 2/2002 | Reed et al. | 709/201 |
| 6,363,377 B1 | 3/2002 | Kravets et al. | 707/4 |
| 6,377,993 B1 | 4/2002 | Brandt et al. | 709/227 |
| 6,381,599 B1 | 4/2002 | Jones et al. | 707/5 |
| 6,393,465 B2 | 5/2002 | Leeds | 709/207 |
| 6,401,091 B1 | 6/2002 | Butler et al. | 707/10 |
| 6,401,118 B1 | 6/2002 | Thomas | 709/224 |
| 6,405,197 B2 | 6/2002 | Gilmour | 707/5 |
| 6,430,545 B1 | 8/2002 | Honarvar et al. | 706/47 |
| 6,430,624 B1 | 8/2002 | Jamtgaard et al. | 709/246 |
| 6,434,544 B1 | 8/2002 | Bakalash et al. | 707/2 |
| 6,434,548 B1 | 8/2002 | Emens et al. | 707/3 |
| 6,438,543 B1 | 8/2002 | Kazi et al. | 707/5 |
| 6,460,038 B1 | 10/2002 | Khan et al. | 707/10 |
| 6,460,069 B1 | 10/2002 | Berlin et al. | 709/201 |
| 6,473,756 B1 | 10/2002 | Ballard | 707/6 |
| 6,477,536 B1 | 11/2002 | Pasumansky et al. | 707/102 |
| 6,480,842 B1 | 11/2002 | Agassi et al. | 707/4 |
| 6,480,885 B1 | 11/2002 | Olivier | 709/207 |
| 6,490,582 B1 * | 12/2002 | Fayyad et al. | 707/6 |
| 6,490,620 B1 | 12/2002 | Ditmer et al. | 709/224 |
| 6,493,703 B1 | 12/2002 | Knight et al. | 707/3 |
| 6,510,432 B1 | 1/2003 | Doyle | 707/10 |
| 6,516,337 B1 | 2/2003 | Tripp et al. | 709/202 |
| 6,519,571 B1 | 2/2003 | Guheen et al. | 705/14 |
| 6,523,021 B1 | 2/2003 | Monberg et al. | 707/2 |
| 6,529,909 B1 | 3/2003 | Bowman-Amuah | 707/10 |
| 6,546,416 B1 | 4/2003 | Kirsch | 709/206 |
| 6,555,738 B2 | 4/2003 | Hughes et al. | 84/609 |
| 6,557,008 B1 | 4/2003 | Temple, III et al. | 707/104.1 |
| 6,564,209 B1 | 5/2003 | Dempski et al. | 707/3 |
| 6,567,797 B1 * | 5/2003 | Schuetze et al. | 707/2 |
| 6,567,803 B1 | 5/2003 | Ramasamy et al. | 707/4 |
| 6,571,234 B1 | 5/2003 | Knight et al. | 707/3 |
| 6,574,619 B1 | 6/2003 | Reddy et al. | 707/2 |
| 6,578,009 B1 | 6/2003 | Shinozaki | 705/10 |
| 6,581,054 B1 | 6/2003 | Bogrett | 707/4 |
| 6,598,054 B2 * | 7/2003 | Schuetze et al. | 707/103 R |
| 6,606,644 B1 | 8/2003 | Ford et al. | 709/203 |
| 6,609,124 B2 | 8/2003 | Chow et al. | 707/5 |
| 6,611,839 B1 | 8/2003 | Nwabueze | 707/101 |
| 6,615,184 B1 | 9/2003 | Hicks | 705/26 |
| 6,621,505 B1 | 9/2003 | Beauchamp et al. | 345/764 |
| 6,625,598 B1 | 9/2003 | Kraffert | 707/3 |
| 6,651,048 B1 | 11/2003 | Agrwal et al. | 707/2 |
| 6,651,055 B1 | 11/2003 | Kilmer et al. | 707/3 |
| 6,651,065 B2 | 11/2003 | Brown et al. | 707/10 |
| 6,662,192 B1 * | 12/2003 | Rebane | 707/104.1 |
| 6,665,658 B1 | 12/2003 | DaCosta et al. | 707/3 |
| 6,668,259 B1 | 12/2003 | Ventura et al. | 707/103 |
| 6,677,963 B1 | 1/2004 | Mani et al. | 345/764 |
| 6,684,207 B1 | 1/2004 | Greenfield et al. | 707/3 |
| 6,684,218 B1 | 1/2004 | Santos et al. | 707/102 |
| 6,691,105 B1 | 2/2004 | Virdy | 707/3 |
| 6,700,575 B1 | 3/2004 | Bovarnick et al. | 345/440 |
| 6,700,590 B1 | 3/2004 | DeMesa et al. | 345/744 |
| 6,714,979 B1 | 3/2004 | Brandt et al. | 709/225 |
| 6,721,689 B2 | 4/2004 | Markle et al. | 702/188 |
| 6,732,161 B1 | 5/2004 | Hess et al. | 709/219 |
| 6,757,689 B2 | 6/2004 | Battas et al. | 707/101 |
| 6,769,009 B1 | 7/2004 | Reisman | 709/201 |
| 6,769,010 B1 | 7/2004 | Knapp et al. | 709/203 |
| 6,772,196 B1 | 8/2004 | Kirsch et al. | 709/206 |
| 6,795,830 B1 | 9/2004 | Banerjee et al. | 707/200 |
| 6,799,221 B1 | 9/2004 | Kenner et al. | 709/245 |
| 6,804,704 B1 | 10/2004 | Bates et al. | 709/217 |
| 6,845,370 B2 | 1/2005 | Burkey et al. | 707/3 |
| 6,868,395 B1 | 3/2005 | Szlam et al. | 705/27 |
| 2001/0020242 A1 | 9/2001 | Gupta et al. | 707/501.1 |
| 2001/0032092 A1 | 10/2001 | Calver | 705/1 |
| 2001/0034663 A1 | 10/2001 | Teveler et al. | 705/26 |
| 2001/0052003 A1 | 12/2001 | Seki et al. | 709/219 |
| 2001/0054004 A1 | 12/2001 | Powers | 705/14 |
| 2001/0056366 A1 | 12/2001 | Naismith | 705/10 |
| 2002/0016735 A1 | 2/2002 | Runge et al. | 705/14 |
| 2002/0032603 A1 | 3/2002 | Yeiser | 705/14 |
| 2002/0032725 A1 | 3/2002 | Araujo et al. | 709/203 |
| 2002/0035501 A1 | 3/2002 | Handel et al. | 705/10 |
| 2002/0035568 A1 * | 3/2002 | Benthin et al. | 707/102 |
| 2002/0038299 A1 | 3/2002 | Zernik et al. | 707/3 |
| 2002/0046138 A1 | 4/2002 | Fitzpatrick et al. | 705/27 |
| 2002/0049622 A1 | 4/2002 | Lettich et al. | 705/7 |
| 2002/0072982 A1 | 6/2002 | Barton et al. | 705/26 |
| 2002/0073058 A1 | 6/2002 | Kremer et al. | 707/1 |
| 2002/0083067 A1 * | 6/2002 | Tamayo et al. | 707/100 |
| 2002/0087387 A1 | 7/2002 | Calver et al. | 705/10 |
| 2002/0107701 A1 | 8/2002 | Batty et al. | 705/1 |
| 2002/0116362 A1 | 8/2002 | Li et al. | 707/1 |
| 2002/0116484 A1 | 8/2002 | Podracky | 709/223 |
| 2002/0143870 A1 | 10/2002 | Rau | 709/204 |
| 2002/0161685 A1 | 10/2002 | Dwinnell | 705/36 |
| 2002/0178166 A1 | 11/2002 | Hsia | 707/100 |
| 2003/0028896 A1 | 2/2003 | Swart et al. | 725/127 |
| 2003/0040845 A1 | 2/2003 | Spool et al. | 700/291 |
| 2003/0065805 A1 | 4/2003 | Barnes, Jr. | 709/231 |
| 2003/0083922 A1 | 5/2003 | Reed | 705/9 |
| 2003/0120502 A1 | 6/2003 | Robb et al. | 705/1 |
| 2003/0139975 A1 | 7/2003 | Perkowski | 705/26 |
| 2004/0002887 A1 | 1/2004 | Fliess et al. | 705/9 |
| 2005/0021611 A1 | 1/2005 | Knapp et al. | 709/203 |
| 2005/0044280 A1 | 2/2005 | Reisman | 710/1 |

FOREIGN PATENT DOCUMENTS

| | | |
|---|---|---|
| EP | 1 162 558 A1 | 12/2001 |
| EP | 1555626 A2 | 7/2005 |
| WO | 95/30201 | 11/1995 |

| | | |
|---|---|---|
| WO | 98/21679 | 5/1998 |
| WO | 98/49641 | 11/1998 |
| WO | 9901826 | 1/1999 |
| WO | 99/66446 | 12/1999 |
| WO | 00/23929 | 4/2000 |
| WO | 01/22692 | 3/2001 |
| WO | 0177935 | 10/2001 |

OTHER PUBLICATIONS

Raymond Kosala et al., Web Mining Research: A Survey, 2000, ACM—SIGKDD Explorations, vol. 2, 1-15.*
Text mining as integration of several related research areas: report on KDD's workshop on text mining 2000, ACM—SIGKDD Explorations, vol. 2, 1-99102.*
Joshen Dorre et al., Text Mining: finding Nuggets in Mountains of textual Data, ACM, 1999, 398-401.*
Pending U.S. Appl. No. 09/862,832 entitled "Web-Based Customer Lead Generator System" filed by Seibel, et al., filed May 21, 2001.
Pending U.S. Appl. No. 09/862,814 entitled "Web-Based Customer Prospects Harvester System" filed by Seibel, et al., filed May 21, 2001.
Pending U.S. Appl. No. 09/865,802 entitled "Database Server System for Web-Based Business Intelligence" filed by Seibel, et al., filed May 24, 2001.
Pending U.S. Appl. No. 09/865,804 entitled "Data Mining System for Web-Based Business Intelligence" filed by Seibel, et al., filed May 24, 2001.
Pending U.S. Appl. No. 09/865,735 entitled "Text Mining System for Web-Based Business Intelligence" filed by Seibel, et al., filed May 24, 2001.
Pending U.S. Appl. No. 09/865,805 entitled "Text Indexing System for Web-Based Business Intelligence" filed by Seibel, et al., filed May 24, 2001.
Paul Dean, "Browsable OLAP Apps on SQL Server Analysis Services," Intelligent Enterprise Magazine, product review, 5 pages, May 7, 2001.
Journyx and IBM team to deliver enterprise project and time tracking software, article, 3 pages, Apr. 5, 1999.
Optio Software, Inc. NEWS: Optio Software and Syntax.net Reseller Partnership Offers a Robust Solution to Provider and Deliver Customized Documents to Support E-Business and Extend the Reach of the Global Enterprise, 2 pages, Dec. 20, 1999.
Andreas Geyer-Schultz et al., "A customer purchase incidence model applied to recommender services" WEBKDD 2001 Mining Log data across all customer touch points, third international workshop, p. 1-11, Aug. 26, 2001.
Beantree, "Enterprise Business Application Architecture" Enterprise Business Components Whitepaper, 5 pages, Sep. 1999.
Lee et al., "An enterprise intelligence system integrating WWW intranet resource" IEEE Xplore Release 1.8, pp. 28-35 with abstract, 1999.
Mathur, Srita, "Creating Unique Customer Experiences: The New Business Model of Cross-Enterprise Integration" IEEE Xplore Release 1.8, pp. 76-81 with abstract, 2000.
Warlick, David, "Searching the Internet: Part III", Raw Materials for the Mind: Teaching & Learning in Information & Technology Rich Schools, ISBN 0-9667432-0-2, Mar. 18, 1999.
Pervasive Solution Sheet "Harvesting Unstructured Data", 5 pages, 2003.
Key Building Blocks for Knowledge Management Solutions, "IBM Intelligent Miner for Text" 2 pages, 1999.
Wood, David, "Metadata Searches of Unstructured Textual Content," Tucana Plugged in Software white Paper, 4 pages, Sep. 26, 2002.
Adomavicius et al., "*Using Data Mining Methods to Build Customer Profiles*", IEEE 2001 computer, pp. 74-82, 2001.
Delen et al., "*An Integrated Toolkit for Enterprise Modeling and Analysis*", Proceedings of the 1999 winter Simulation Conference, pp. 289-297, 1999.
Griffin et al., "*Enterprise Customer Relationship Management*", DM review, 15 pages, Dec. 1999.
Parkhomenko et al., "*Personalization Using Hybrid Data Mining Approaches in E-Business Applications*", Amer. assoc. for Artificial Intelligence, 7 pages, 2002.
Weiss, Gary M., "*Data Mining in Telecommunications*", 13 pages, no date.
Watson, Ian, "A Case Based Reasoning Application for Engineering Sales Support Using Introspective Reasoning," 2000 American Association for Artificial Intelligence, 6 pages, 2000.
Elprin, Nick et al., An Analysis of Database-Driven Mail Servers, LISA XVII, pp. 15-22, 2003.
80-20 Software, "End Email and File Chaos," 80-20 Retriever Enterprise Edition, 4 pages, 2003.
An InsumaGmbH White Paper, "OASIS Distributed Search Engine," pp. 1-11, no date.
Schwartz, Michael F. et al., "Applying an information gathering architecture to Netfind: a white pages tool for a changing and growing internet", IEEE/ACM Transactions on Networking (TON), vol. 2, Issue 5, Oct. 1994, pp. 426-439.
Gravano, Luis et al., "GIOSS: text-source discovery over the Internet", ACM Transactions on Database Systems (TODS), vol. 24, Issue 2, Jun. 1999, pp. 229-264.
Mouri, T. et al., "Extracting new topic contents from hidden web sites", International Conference on Information Technology: Coding and Computing 2004, pp. 314-319.
Murtagh, Fionn, "Distributed Information Search and Retrieval for Astronomical Resource Discovery and Data Mining", Library and Information Services in Astronomy III, ASP Conference Series, vol. 153, 1998, pp. 51-60.

\* cited by examiner

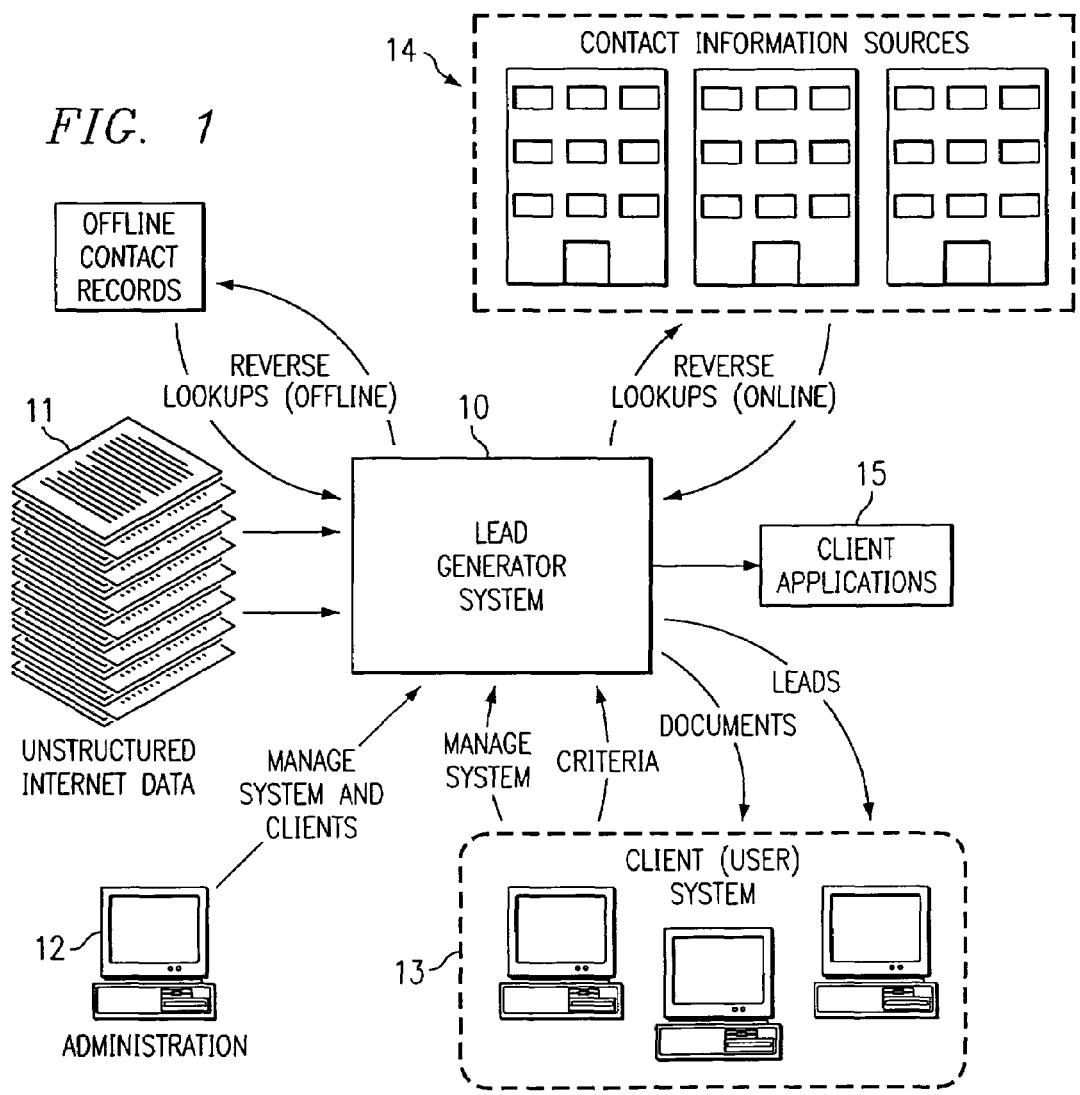
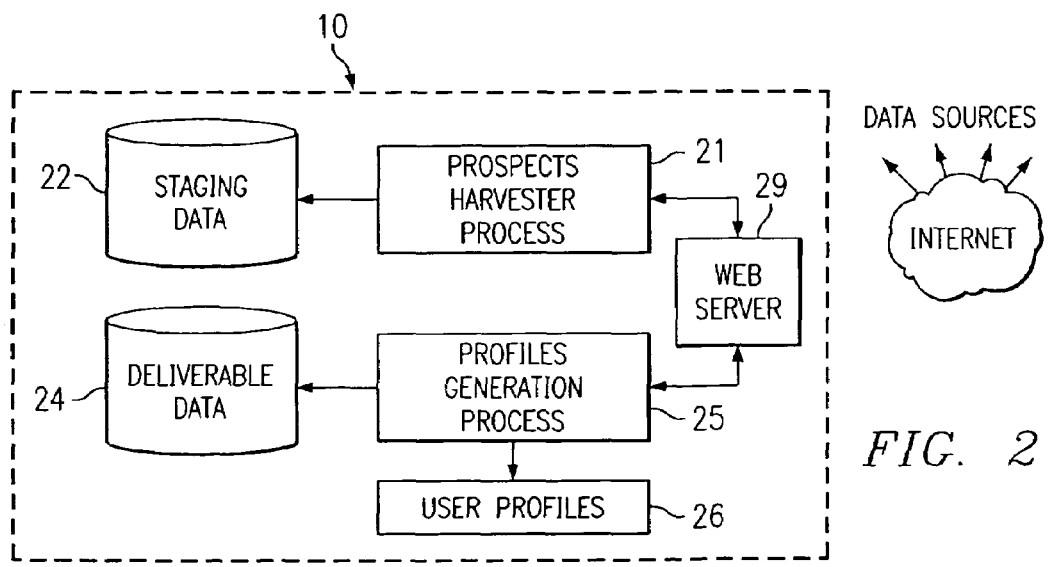

US 7,330,850 B1

TEXT MINING SYSTEM FOR WEB-BASED BUSINESS INTELLIGENCE APPLIED TO WEB SITE SERVER LOGS

RELATED PATENT APPLICATIONS

This application claims the benefit of U.S. Provisional Application No. 60/238,094, filed Oct. 4, 2000 and entitled "Server Log File System Utilizing Text mining Methodologies and Technologies". The present patent application and additionally the following patent application is a conversion from the foregoing provisional filing: U.S. Pat. No. 7,043,531 entitled "Web-Based Customer Lead. Generator System with Pre-Emptive Profiling" and filed Oct. 4, 2001.

This patent application is related to the following pending applications: patent application Ser. No. 09/862,832 entitled "Web-Based Customer Lead Generator System" and filed May 21, 2001; patent application Ser. No. 09/865,802 entitled "Database Server System for Web-Based Business Intelligence" and filed May 24, 2001; patent application Ser. No. 09/865,804 entitled "Data Mining System for Web-Based Business Intelligence" and filed May 24, 2001; patent application Ser. No. 09/865,735 entitled "Text Mining System for Web-Based Business Intelligence" and filed May 24, 2001; patent application Ser. No. 09/862,814 entitled "Web-Based Customer Prospects Harvester System" and filed May 21, 2001; patent application Ser. No. 09/865,805 entitled "Text Indexing System for Web-Based Business Intelligence" and filed May 24, 2001.

TECHNICAL FIELD OF THE INVENTION

This invention relates to electronic commerce, and more particularly to business intelligence software tools for acquiring leads for prospective customers, using Internet data sources.

BACKGROUND OF THE INVENTION

Most small and medium sized companies face similar challenges in developing successful marketing and sales campaigns. These challenges include locating qualified prospects who are making immediate buying decisions. It is desirable to personalize marketing and sales information to match those prospects, and to deliver the marketing and sales information in a timely and compelling manner. Other challenges are to assess current customers to determine which customer profile produces the highest net revenue, then to use those profiles to maximize prospecting results. Further challenges are to monitor the sales cycle for opportunities and inefficiencies, and to relate those findings to net revenue numbers.

Today's corporations are experiencing exponential growth to the extent that the volume and variety of business information collected and accumulated is overwhelming. Further, this information is found in disparate locations and formats. Finally, even if the individual data bases and information sources are successfully tapped, the output and reports may be little more than spreadsheets, pie charts and bar charts that do not directly relate the exposed business intelligence to the companies' processes, expenses, and to its net revenues.

With the growth of the Internet, one trend in developing marketing and sales campaigns is to gather customer information by accessing Internet data sources. Internet data intelligence and data mining products face specific challenges. First, they tend to be designed for use by technicians, and are not flexible or intuitive in their operation; secondly, the technologies behind the various engines are changing rapidly to take advantage of advances in hardware and software, and finally, the results of their harvesting and mining are not typically related to a specific department goals and objectives.

SUMMARY OF THE INVENTION

One aspect of the invention is a text mining system for collecting business intelligence about a client, as well as for identifying prospective customers of the client. The text mining system may be used in a lead generation system accessible by the client via the Internet.

The text mining system has various components, including a data acquisition process that extracts textual data from Internet web sites, including their logs, content, processes, and transactions. The system compares log data to content and process data, and relates the results of the comparison to transaction data. This permits the system to provide aggregate cluster data representing statistics useful for customer lead generation.

BRIEF DESCRIPTION OF THE DRAWINGS

FIG. 1 illustrates the operating environment for a web based lead generator system in accordance with the invention.

FIG. 2 illustrates the various functional elements of the lead generator system.

DETAILED DESCRIPTION OF THE INVENTION

Lead Generator System Overview

Figure 3:
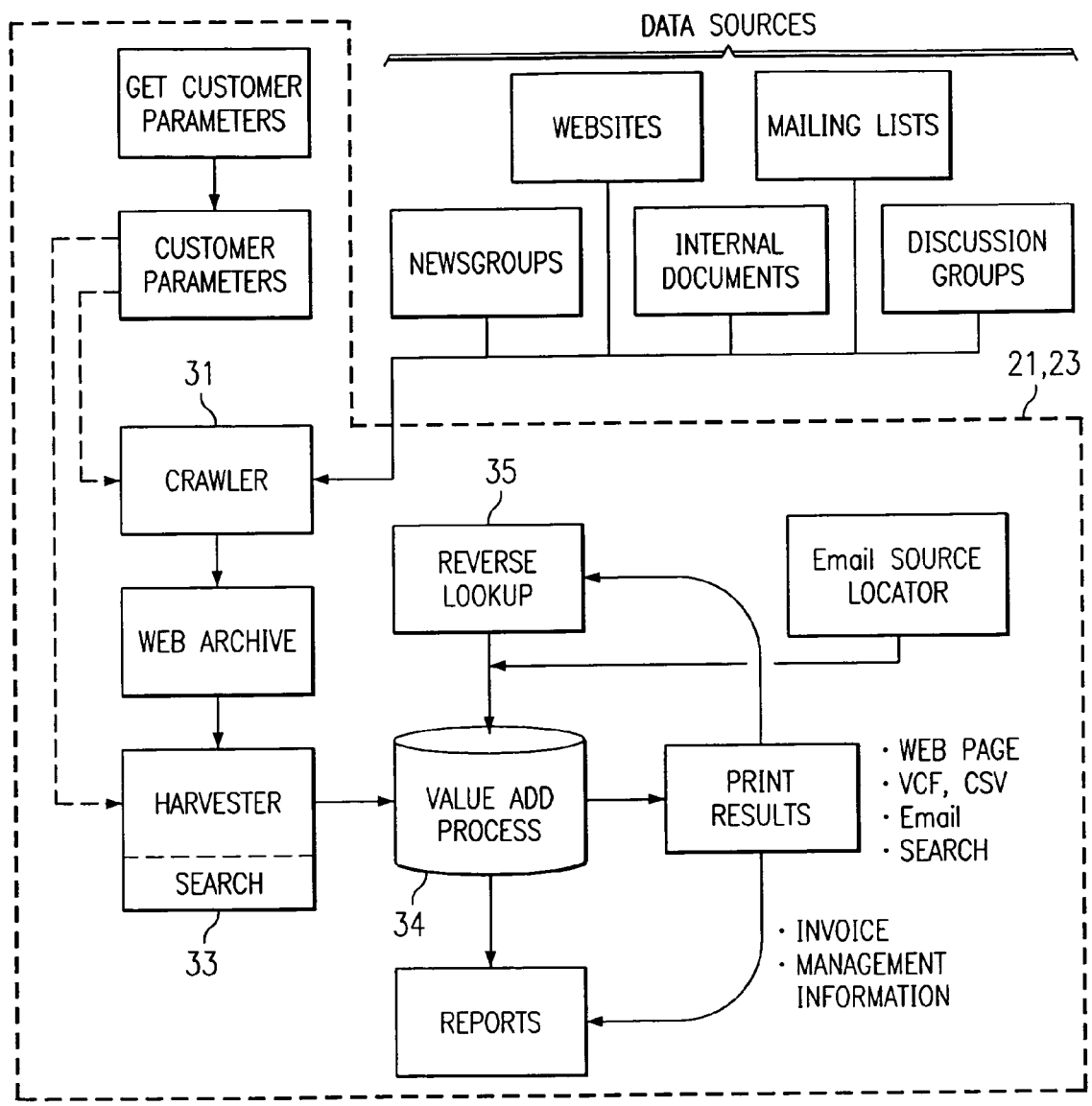
FIG. 3 illustrates the various data sources and a first embodiment of the prospects harvester.

FIG. 1 illustrates the operating environment for a web-based customer lead generation system 10 in accordance with the invention. System 10 is in communication, via the Internet, with unstructured data sources 11, an administrator 12, client systems 13, reverse look-up sources 14, and client applications 15.

The users of system 10 may be any business entity that desires to conduct more effective marketing campaigns. These users may be direct marketers who wish to maximizing the effectiveness of direct sales calls, or e-commerce web site who wish to build audiences.

In general, system 10 may be described as a web-based Application Service Provider (ASP) data collection tool. The general purpose of system 10 is to analyze a client's marketing and sales cycle in order to reveal inefficiencies and opportunities, then to relate those discoveries to net revenue estimates. Part of the latter process is proactively harvesting prequalified leads from external and internal data sources. As explained below, system 10 implements an automated process of vertical industry intelligence building that involves automated reverse lookup of contact information using an email address and key phrase highlighting based on business rules and search criteria.

More specifically, system 10 performs the following tasks:

Uses client-provided criteria to search Internet postings for prospects who are discussing products or services that are related to the client's business offerings Selects those prospects matching the client's criteria Pushes the harvested prospect contact information to the client, with a link to the original document that verifies the prospects interest Automatically opens or generates personalized sales scripts and direct marketing materials that appeal to the prospects' stated or implied interests Examines internal sales and marketing materials, and by applying data and text mining analytical tools, generates profiles of the client's most profitable customers Cross-references and matches the customer profiles with harvested leads to facilitate more efficient harvesting and sales presentations In the audience building environment, requests permission to contact the prospect to offer discounts on services or products that are directly or indirectly related to the conversation topic, or to direct the prospect to a commerce source.

System 10 provides open access to its web site. A firewall (not shown) is used to prevent access to client records and the entire database server. Further details of system security are discussed below in connection with FIG. 5.

Consistent with the ASP architecture of system 10, interactions between client system 13 and system 10 will typically be by means of Internet access, such as by a web portal. Authorized client personnel will be able to create and modify profiles that will be used to search designated web sites and other selected sources for relevant prospects.

Client system 11 may be any computer station or network of computers having data communication to lead generator system 10. Each client system 11 is programmed such that each client has the following capabilities: a master user account and multiple sub user accounts, a user activity log in the system database, the ability to customize and personalize the workspace; configurable, tiered user access; online signup, configuration and modification, sales territory configuration and representation, goals and target establishment, and online reporting comparing goals to target (e.g., expense/revenue; budget/actual).

Administration system 14 performs such tasks as account activation, security administration, performance monitoring and reporting, assignment of master user id and licensing limits (user seats, access, etc.), billing limits and profile, account termination and lockout, and a help system and client communication.

System 10 interfaces with various client applications 15. For example, system 10 may interface with commercially available enterprise resource planning (ERP), sales force automation (SFA), call center, e-commerce, data warehousing, and custom and legacy applications.

Lead Generator System Architecture

FIG. 2 illustrates the various functional elements of lead generator system 10. In the embodiment of FIG. 2, the above described functions of system 10 are partitioned between two distinct processes.

A prospects harvester process 21 uses a combination of external data sources, client internal data sources and user-parameter extraction interfaces, in conjunction with a search, recognition and retrieval system, to harvest contact information from the web and return it to a staging data base 22. In general, process 21 collects business intelligence data from both inside the client's organization and outside the organization. The information collected can be either structured data as in corporate databases/spreadsheet files or unstructured data as in textual files.

Process 21 may be further programmed to validate and enhance the data, utilizing a system of lookup, reverse lookup and comparative methodologies that maximize the value of the contact information. Process 21 may be used to elicit the prospect's permission to be contacted. The prospect's name and email address are linked to and delivered with ancillary information to facilitate both a more efficient sales call and a tailored e-commerce sales process. The related information may include the prospect's email address, Web site address and other contact information. In addition, prospects are linked to timely documents on the Internet that verify and highlight the reason(s) that they are in fact a viable prospect. For example, process 21 may link the contact data, via the Internet, to a related document wherein the contact's comments and questions verify the high level value of the contact to the user of this system (the client).

A profiles generation process 25 analyzes the user's in-house files and records related to the user's existing customers to identify and group those customers into profile categories based on the customer's buying patterns and purchasing volumes. The patterns and purchasing volumes of the existing customers are overlaid on the salient contact information previously harvested to allow the aggregation of the revenue-based leads into prioritized demand generation sets. Process 25 uses an analysis engine and both data and text mining engines to mine a company's internal client records, digital voice records, accounting records, contact management information and other internal files. It creates a profile of the most profitable customers, reveals additional prospecting opportunities, and enables sales cycle improvements. Profiles include items such as purchasing criteria, buying cycles and trends, cross-selling and up-selling opportunities, and effort to expense/revenue correlations. The resulting profiles are then overlaid on the data obtained by process 21 to facilitate more accurate revenue projections and to enhance the sales and marketing process. The client may add certain value judgments (rankings) in a table that is linked to a unique lead id that can subsequently be analyzed by data mining or OLAP analytical tools. The results are stored in the deliverable database 24.

Profiles generation process 25 can be used to create a user (client) profiles database 26, which stores profiles of the client and its customers. As explained below, this database 26 may be accessed during various data and text mining processes to better identify prospective customers of the client.

Web server 29 provides the interface between the client systems 13 and the lead generation system 10. As explained below, it may route different types of requests to different sub processes within system 10. The various web servers described below in connection with FIGS. 4-11 may be implemented as separate servers in communication with a front end server 29. Alternatively, the server functions could be integrated or partitioned in other ways.

Data Sources

FIG. 3 provides additional detail of the data sources of FIGS. 1 and 2. Access to data sources may be provided by various text mining tools, such as by the crawler process 31 or 41 of FIGS. 3 and 4.

One data source is newsgroups, such as USENET. To access discussion documents from USENET newsgroups such as "news.giganews.com", NNTP protocol is used by the crawler process to talk to USENET news server such as "news.giganews.com." Most of the news servers only archive news articles for a limited period (giganews.com archives news articles for two weeks), it is necessary for the iNet Crawler to incrementally download and archive these newsgroups periodically in a scheduled sequence. This aspect of crawler process 31 is controlled by user-specified parameters such as news server name, IP address, newsgroup name and download frequency, etc.

Another data source is web-Based discussion forums. The crawler process follows the hyper links on a web-based discussion forum, traverse these links to user or design specified depths and subsequently access and retrieve discussion documents. Unless the discussion documents are archived historically on the web site, the crawler process will download and archive a copy for each of the individual documents in a file repository. If the discussion forum is membership-based, the crawler process will act on behalf of the authorized user to logon to the site automatically in order to retrieve documents. This function of the crawler process is controlled by user specified parameters such as a discussion forum's URL, starting page, the number of traversal levels and crawling frequency.

A third data source is Internet-based or facilitated mailing lists wherein individuals send to a centralized location emails that are then viewed and/or responded to by members of a particular group. Once a suitable list has been identified a subscription request is initiated. Once approved, these emails are sent to a mail server where they are downloaded, stored in system 10 and then processed in a fashion similar to documents harvested from other sources. The system stores in a database the filters, original URL and approval information to ensure only authorized messages are actually processed by system 10.

A fourth data source is corporations' internal documents. These internal documents may include sales notes, customer support notes and knowledge base. The crawler process accesses corporations' internal documents from their Intranet through Unix/Windows file system or alternately be able to access their internal documents by riding in the databases through an ODBC connection. If internal documents are password-protected, crawler process 31 acts on behalf of the authorized user to logon to the file systems or databases and be able to subsequently retrieve documents. This function of the crawler process is controlled by user-specified parameters such as directory path and database ODBC path, starting file id and ending file id, and access frequency. Other internal sources are customer information, sales records, accounting records, and digitally recorded correspondence such as e-mail files or digital voice records.

A fifth data source is web pages from Internet web sites. This function of the crawler process is similar to the functionality associated with web-discussion-forums. Searches are controlled by user-specified parameters such as web site URL, starting page, the number of traversal levels and crawling frequency.

Database Server System

Figure 4:
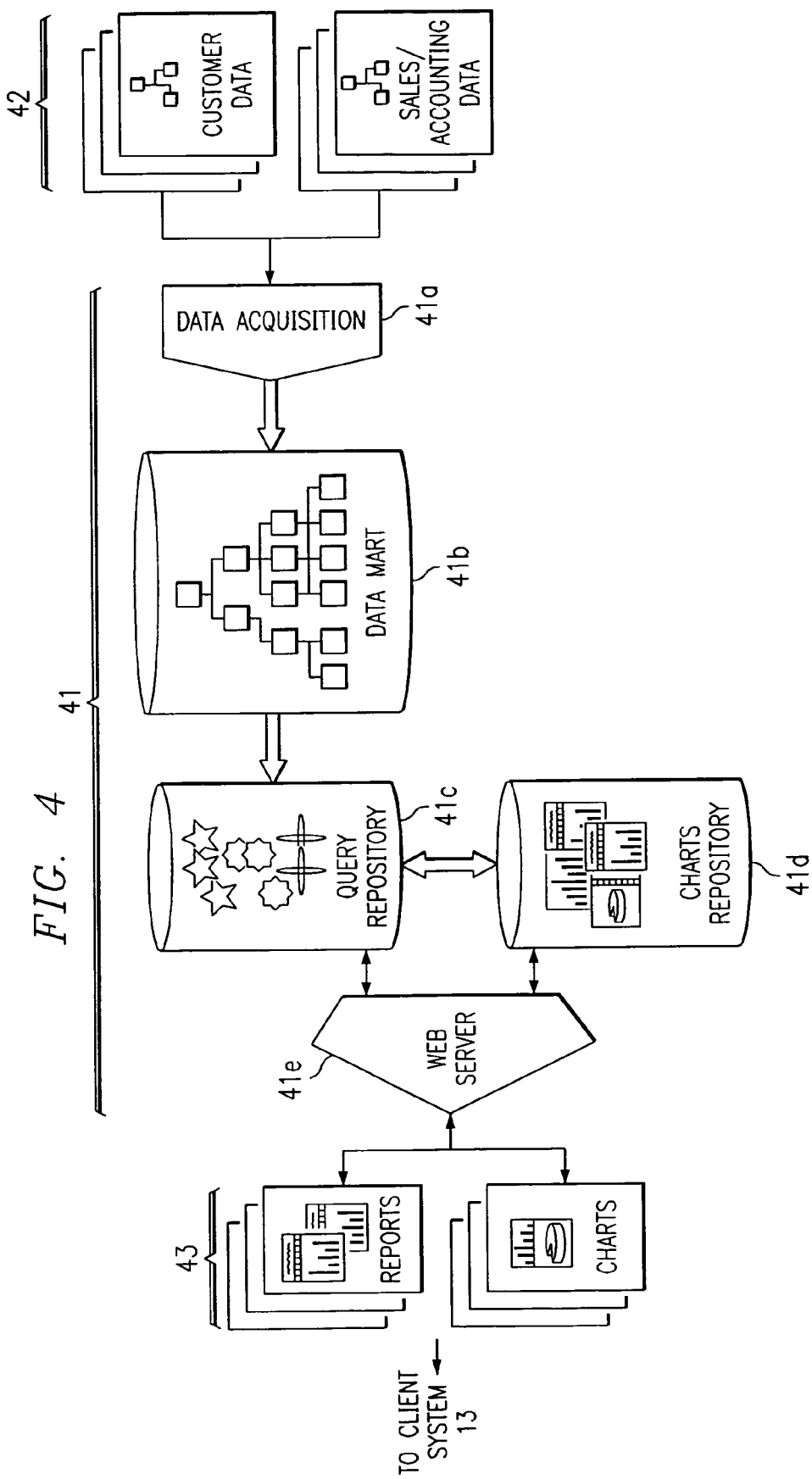
FIGS. 4 and 5 illustrate a database server system, which may be used within the lead generation system of FIGS. 1 and 2.
Figure 5:
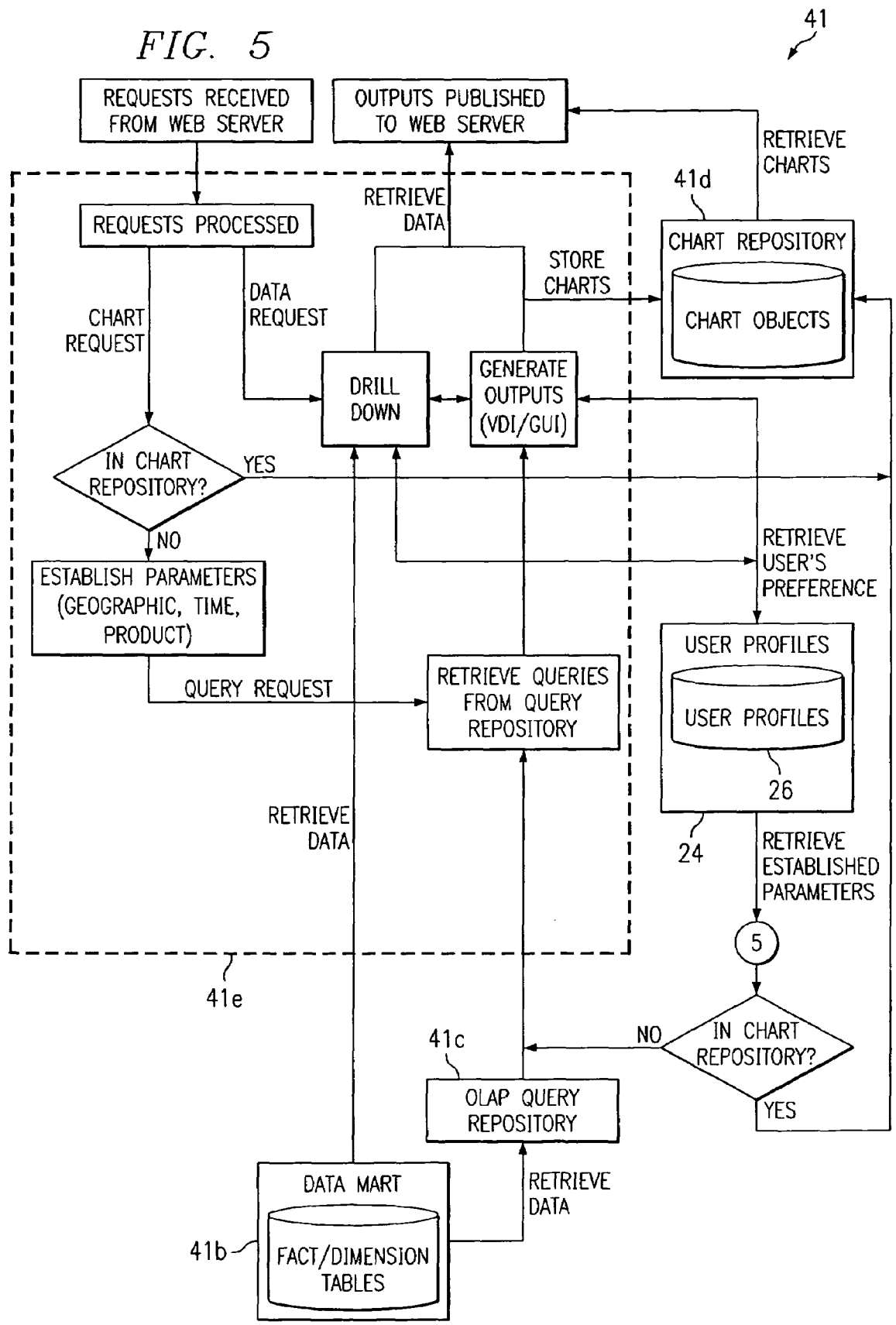

FIGS. 4 and 5 illustrate a database server system 41, which may be used within system 10 of FIGS. 1 and 2. FIG. 4 illustrates the elements of system 41 and FIG. 5 is a data flow diagram. Specifically, system 41 could be used to implement the profiles generation process 25, which collects profile data about the client.

The input data 42 can be the client's sales data, customer-contact data, customer purchase data and account data etc. Various data sources for customer data can be contact management software packages such as ACT, MarketForce, Goldmine, and Remedy. Various data sources for accounting data are Great Plains, Solomon and other accounting packages typically found in small and medium-sized businesses. If the client has ERP (enterprise resource planning) systems (such as JD Edwards, PeopleSoft and SAP) installed, the data sources for customer and accounting data will be extracted from ERP customer and accounting modules. This data is typically structured and stored in flat files or relational databases. System 41 is typically an OLAP (On-line analytic processing) type server-based system. It has five major components. A data acquisition component 41a collects and extracts data from different data sources, applying appropriate transformation, aggregation and cleansing to the data collected. This component consists of predefined data conversions to accomplish most commonly used data transformations, for as many different types of data sources as possible. For data sources not covered by these predefined conversions, custom conversions need to be developed. The tools for data acquisition may be commercially available tools, such as Data Junction, ETI*EXTRACT, or equivalents. Open standards and APIs will permit employing the tool that affords the most efficient data acquisition and migration based on the organizational architecture.

Data mart 41b captures and stores an enterprise's sales information. The sales data collected from data acquisition component 41a are "sliced and diced" into multidimensional tables by time dimension, region dimension, product dimension and customer dimension, etc. The general design of the data mart follows data warehouse/data mart Star-Schema methodology. The total number of dimension tables and fact tables will vary from customer to customer, but data mart 41b is designed to accommodate the data collected from the majority of commonly used software packages such as PeopleSoft or Great Plains.

Various commercially available software packages, such as Cognos, Brio, Informatica, may be used to design and deploy data mart 41b. The Data Mart can reside in DB2, Oracle, Sybase, MS SQL server, P.SQL or similar database application. Data mart 41b stores sales and accounting fact and dimension tables that will accommodate the data extracted from the majority of industry accounting and customer contact software packages.

A Predefined Query Repository Component 41c is the central storage for predefined queries. These predefined queries are parameterized macros/business rules that extract information from fact tables or dimension tables in the data mart 41b. The results of these queries are delivered as business charts (such as bar charts or pie charts) in a web browser environment to the end users. Charts in the same category are bounded with the same predefined query using different parameters. (i.e. quarterly revenue charts are all associated with the same predefined quarterly revenue query, the parameters passed are the specific region, the specific year and the specific quarter). These queries are stored in either flat file format or as a text field in a relational database.

A Business Intelligence Charts Repository Component 41d serves two purposes in the database server system 41. A first purpose is to improve the performance of chart retrieval process. The chart repository 41d captures and stores the most frequently visited charts in a central location. When an end user requests a chart, system 41 first queries the chart repository 41d to see if there is an existing chart. If there is a preexisting chart, server 41e pulls that chart directly from the repository. If there is no preexisting chart, server 41e runs the corresponding predefined query from the query repository 41c in order to extract data from data mart 41b and subsequently feed the data to the requested chart. A second purpose is to allow chart sharing, collaboration and distribution among the end users. Because charts are treated as objects in the chart repository, users can bookmark a chart just like bookmarking a regular URL in a web browser. They can also send and receive charts as an email attachment. In addition, users may logon to system 41 to collaboratively make decisions from different physical locations. These users can also place the comments on an existing chart for collaboration.

Another component of system 41 is the Web Server component 41e, which has a number of subcomponents. A web server subcomponent (such as Microsoft IIS or Apache server or any other commercially available web servers) serves HTTP requests. A database server subcomponent (such as Tango, Cold Fusion or PHP) provides database drill-down functionality. An application server subcomponent routes different information requests to different other servers. For example, sales revenue chart requests will be routed to the database system 41; customer profile requests will be routed to a Data Mining server, and competition information requests will be routed to a Text Mining server. The latter two systems are discussed below. Another subcomponent of server 41e is the chart server, which receives requests from the application server. It either runs queries against data mart 41b, using query repository 41c, or retrieves charts from chart repository 41c.

As output 43, database server system 41 delivers business intelligence about an organization's sales performance as charts over the Internet or corporate Intranet. Users can pick and choose charts by regions, by quarters, by products, by companies and even by different chart styles. Users can drill-down on these charts to reveal the underlying data sources, get detailed information charts or detailed raw data. All charts are drill-down enabled allowing users to navigate and explore information either vertically or horizontally. Pie charts, bar charts, map views and data views are delivered via the Internet or Intranet.

As an example of operation of system 41, gross revenue analysis of worldwide sales may be contained in predefined queries that are stored in the query repository 41c. Gross revenue queries accept region and/or time period as parameters and extract data from the Data Mart 41b and send them to the web server 41e. Web server 41e transforms the raw data into charts and publishes them on the web.

Data Mining System

Figure 6:
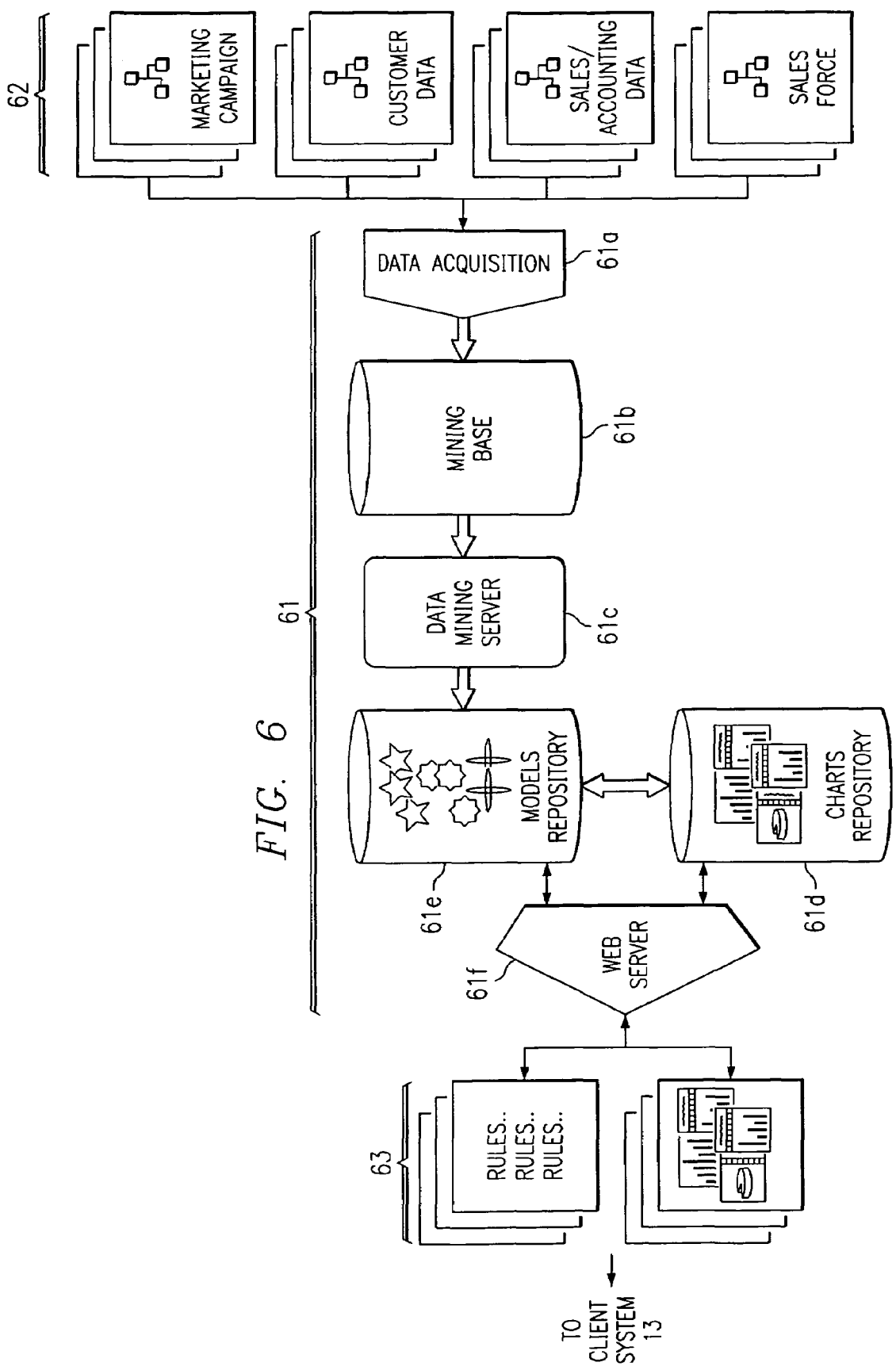
FIGS. 6 and 7 illustrate a data mining system, which may be used within the lead generation system of FIGS. 1 and 2.
Figure 7:
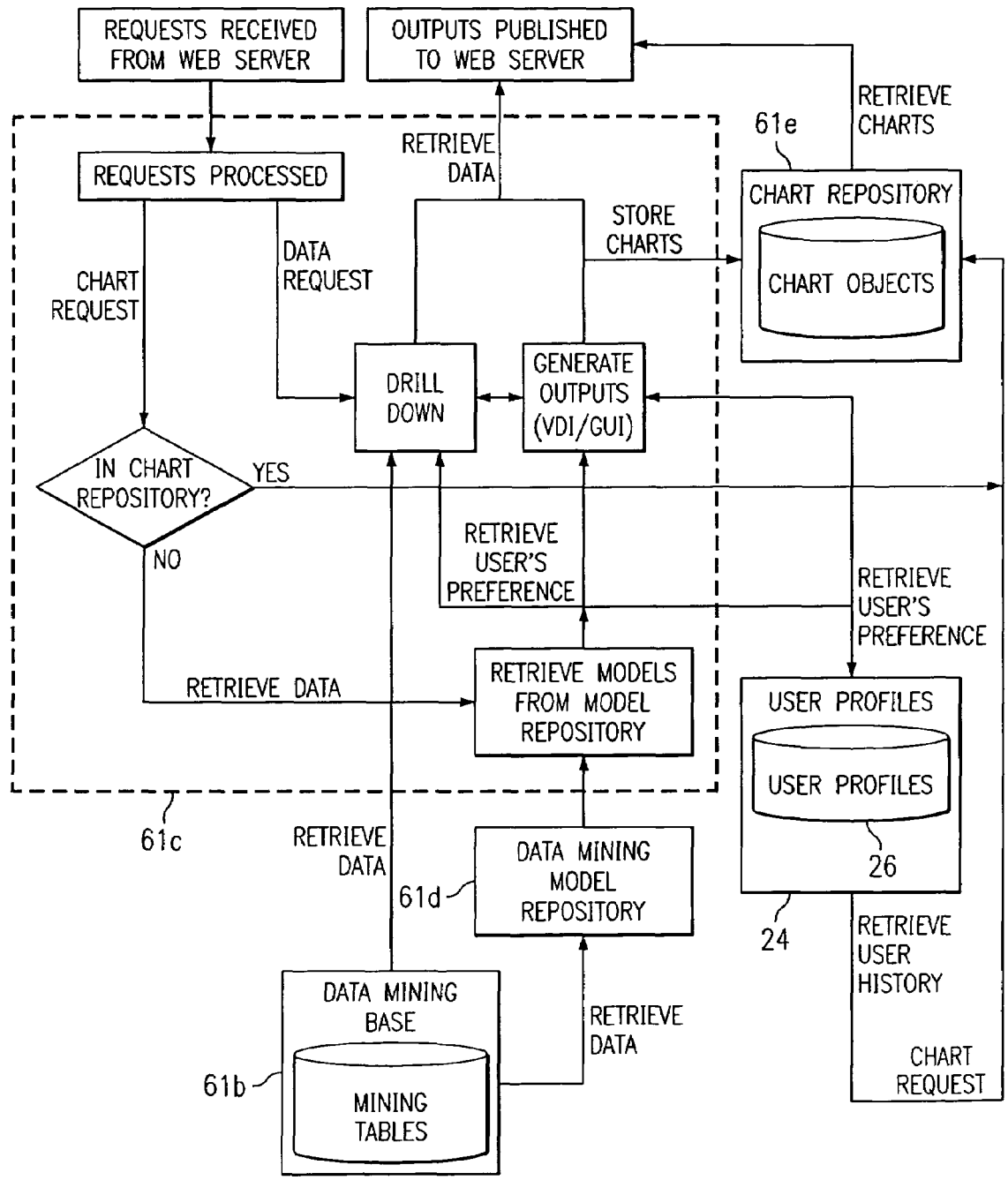

FIGS. 6 and 7 illustrate a data mining system 61, which may be used within system 10 of FIGS. 1 and 2.

FIG. 6 illustrates the elements of system 61 and FIG. 7 is a data flow diagram. Specifically, system 61 could be used to implement the profiles process 25, which collects profile data about the client.

Data sources 62 for system 61 are the Data Mart 41b, e.g., data from the tables that reside in Data Mart 41b, as well as data collected from marketing campaigns or sales promotions.

For data coming from the Data Mart 41b, data acquisition process 61a between Mining Base 61b and Data Mart 41b extract/transfer and format/transform data from tables in the Data Mart 41b into Data Mining base 61b. For data collected from sales and marketing events, data acquisition process 61a may be used to extract and transform this kind of data and store it in the Data Mining base 61b.

Data Mining base 61b is the central data store for the data for data mining system 61. The data it stores is specifically prepared and formatted for data mining purposes. The Data Mining base 61b is a separate data repository from the Data Mart 41b, even though some of the data it stores is extracted from Data Mart's tables. The Data Mining base 61b can reside in DB2, Oracle, Sybase, MS SQL server, P.SQL or similar database application.

Chart repository 61d contains data mining outputs. The most frequently used decision tree charts are stored in the chart repository 61d for rapid retrieval.

Customer purchasing behavior analysis is accomplished by using predefined Data Mining models that are stored in a model repository 61e. Unlike the predefined queries of system 41, these predefined models are industry-specific and business-specific models that address a particular business problem. Third party data mining tools such as IBM Intelligent Miner and Clementine, and various integrated development environments (IDEs) may be used to explore and develop these data mining models until the results are satisfactory. Then the models are exported from the IDE into standalone modules (in C or C++) and integrated into model repository 61e by using data mining APIs.

Data mining server 61c supplies data for the models, using data from database 61c. FIG. 7 illustrates the data paths and functions associated with server 61c. Various tools and applications that may be used to implement server 61c include VDI, EspressChart, and a data mining GUI.

The outputs of server 61e may include various options, such as decision trees, Rule Sets, and charts.

By default, all the outputs have drill-down capability to allow users to interactively navigate and explore information in either a vertical or horizontal direction. Views may also be varied, such as by influencing factor. For example, in bar charts, bars may represent factors that influence customer purchasing (decision-making) or purchasing behavior. The height of the bars may represent the impact on the actual customer purchase amount, so that the higher the bar is the more important the influencing factor is on customers, purchasing behavior. Decision trees offer a unique way to deliver business intelligence on customers' purchasing behavior. A decision tree consists of tree nodes, paths and node notations. Each individual node in a decision tree represents an influencing. A path is the route from root node (upper most level) to any other node in the tree. Each path represents a unique purchasing behavior that leads to a particular group of customers with an average purchase amount. This provides a quick and easy way for on-line users to identify where the valued customers are and what the most important factors are when customer are making purchase decisions. This also facilitates tailored marketing campaigns and delivery of sales presentations that focus on the product features or functions that matter most to a particular customer group. Rules Sets are plain-English descriptions of the decision tree. A single rule in the RuleSet is associated with a particular path in the decision tree. Rules that lead to the same destination node are grouped into a RuleSet. RuleSet views allow users to look at the same information presented in a decision tree from a different angle. When users drill down deep enough on any chart, they will reach the last drill-down level that is data view. A data view is a table view of the underlying data that supports the data mining results. Data Views are dynamically linked with Data Mining base 61b and Data Mart 41b through web server 61f.

Web server 61f, which may be the same as database server 41e, provides Internet access to the output of mining server 61c. Existing outputs may be directly accessed from storage in charts repository 61d. Or requests may be directed to models repository 61e. Consistent with the application service architecture of lead generation system 10, access by the client to web server 61f is via the Internet and the client's web browser.

Text Mining System

Figure 8:
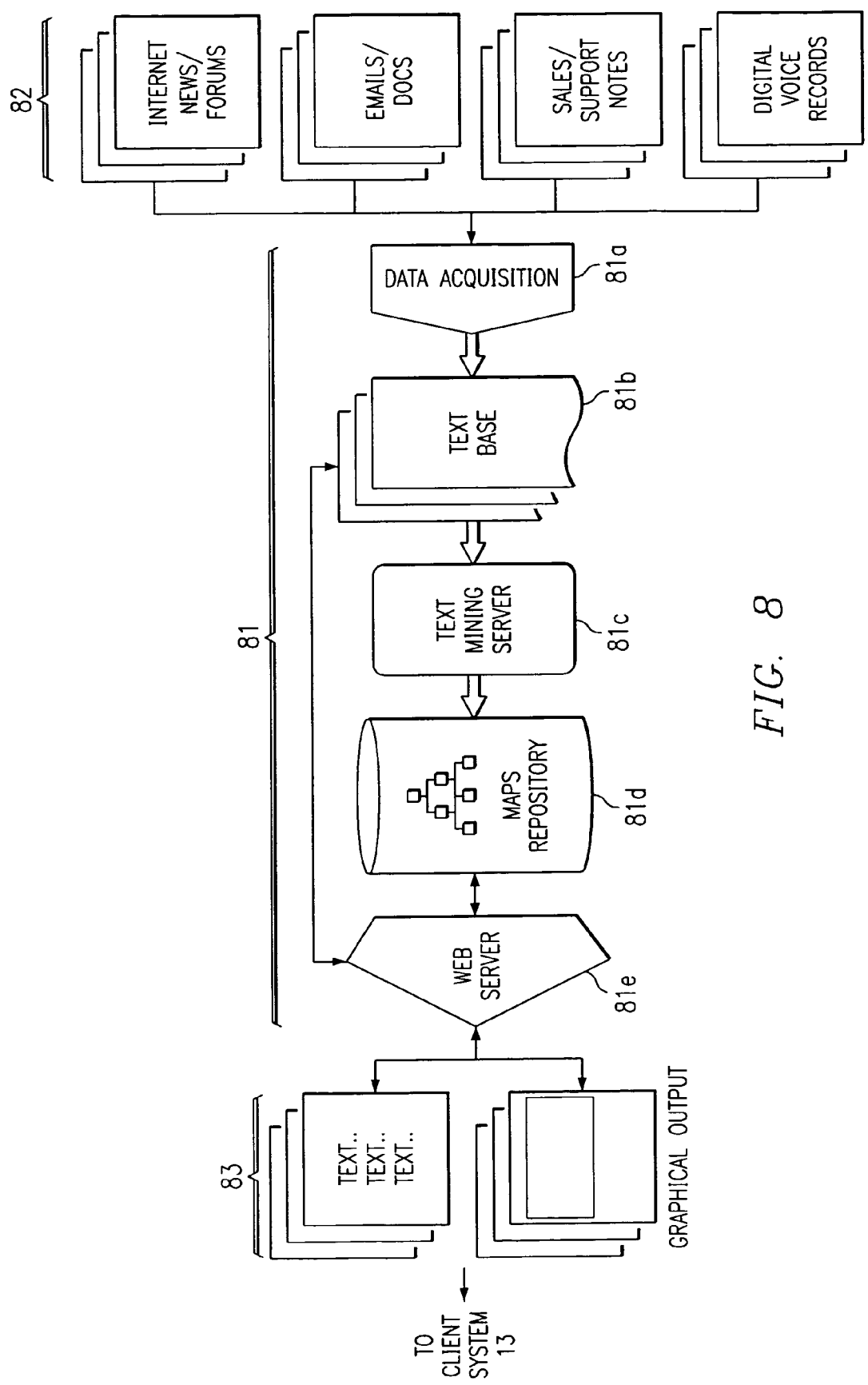
FIGS. 8 and 9 illustrate a text mining system, which may be used within the lead generation system of FIGS. 1 and 2.
Figure 9:
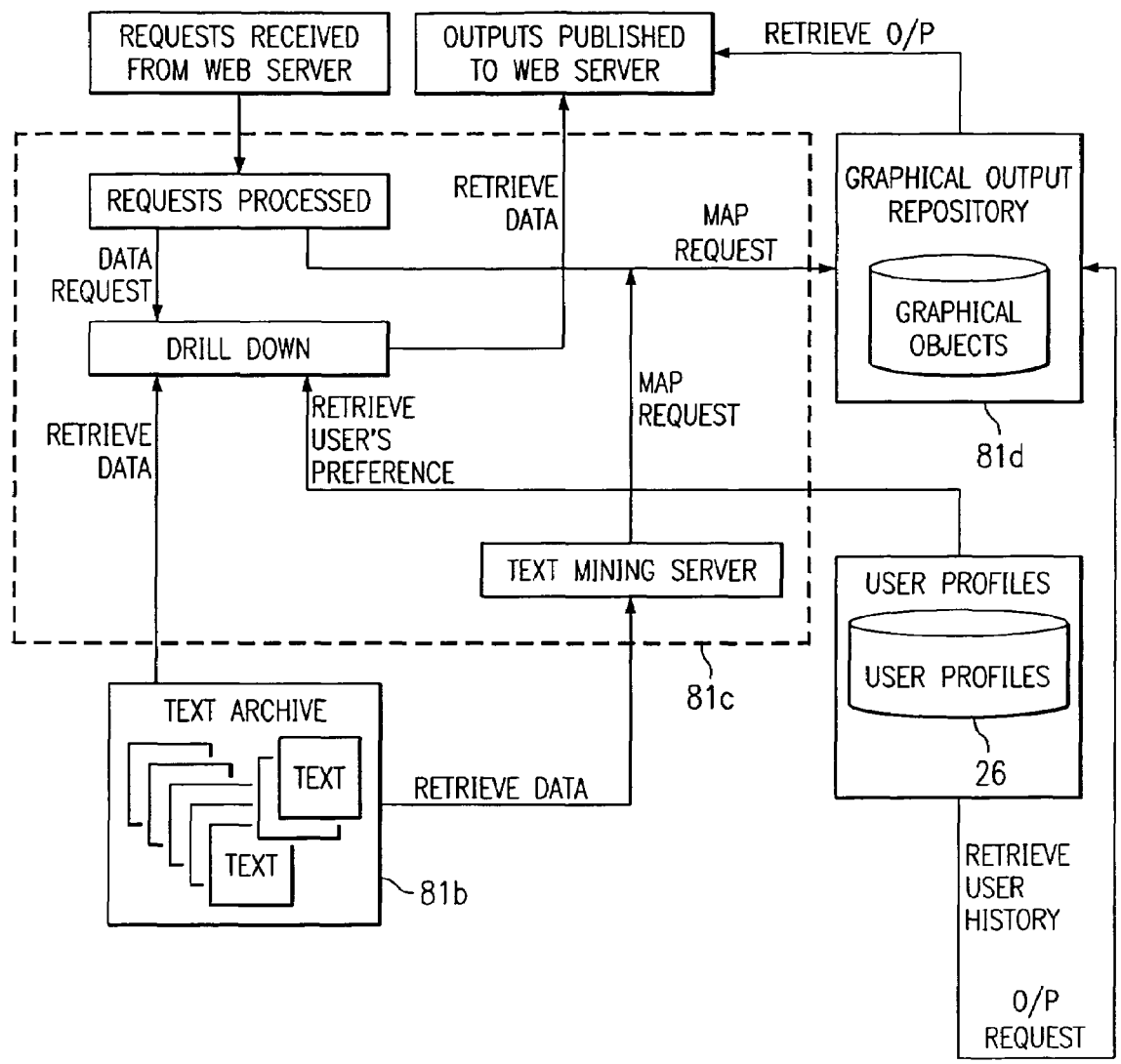

FIGS. 8 and 9 illustrate a text mining system 81, which may be used within system 10 of FIGS. 1 and 2. FIG. 8 illustrates the elements of system 81 and FIG. 9 is a data flow diagram. As indicated in FIG. 8, the source data 82 for system 81 may be either external and internal data sources. Thus, system 81 may be used to implement both the prospects system and profiles system of FIG. 2.

The source data 82 for text mining system 81 falls into two main categories, which can be mined to provide business intelligence. Internal documents contain business information about sales, marketing, and human resources. External sources consist primarily of the public domain in the Internet. Newsgroups, discussion forums, mailing lists and general web sites provide information on technology trends, competitive information, and customer concerns.

More specifically, the source data 82 for text mining system 81 is from five major sources. Web Sites: on-line discussion groups, forums and general web sites. Internet News Group: Internet newsgroups for special interests such as alt.ecommerce and microsoft.software.interdev. For some of the active newsgroups, hundreds of news articles may be harvested on a weekly basis. Internet Mailing Lists: mailing lists for special interests, such as e-commerce mailing list, company product support mailing list or Internet marketing mailing list. For some of the active mailing lists, hundreds of news articles will be harvested on a weekly basis. Corporate textual files: internal documents such as emails, customer support notes sales notes, and digital voice records.

For data acquisition 81a from web sites, user-interactive web crawlers are used to collect textual information. Users can specify the URLs, the depth and the frequency of web crawling. The information gathered by the web crawlers is stored in a central repository, the text archive 81b. For data acquisition from newsgroups, a news collector contacts the news server to download and transform news articles in an html format and deposit them in text archive 81b. Users can specify the newsgroups names, the frequency of downloads and the display format of the news articles to news collector. For data acquisition from Internet mailing lists, a mailing list collector automatically receives, sorts and formats email messages from the subscribed mailing lists and deposit them into text archive 81b. Users can specify the mailing list names and address and the display format of the mail messages. For data acquisition from client text files, internal documents are sorted, collected and stored in the Text Archive 81b. The files stored in Text Archive 81b can be either physical copies or dynamic pointers to the original files.

The Text Archive 81b is the central data store for all the textual information for mining. The textual information it stores is specially formatted and indexed for text mining purpose. The Text Archive 81b supports a wide variety of file formats, such plain text, html, MS Word and Acrobat.

Text Mining Server 81c operates on the Text Archive 81b. Tools and applications used by server 81c may include ThemeScape and a Text Mining GUI 81c. A repository 81d stores text mining outputs. Web server 81e is the front end interface to the client system 13, permitting the client to access database 81b, using an on-line search executed by server 81c or server 81e.

The outputs of system 81 may include various options. Map views and simple query views may be delivered over the Internet or Intranet. By default, all the outputs have drill-down capability to allow users to reach the original documents. HTML links will be retained to permit further lateral or horizontal navigation. Keywords will be highlighted or otherwise pointed to in order to facilitate rapid location of the relevant areas of text when a document is located through a keyword search. For example, Map Views are the outputs produced by ThemeScape. Textual information is presented on a topological map on which similar "themes" are grouped together to form "mountains." On-line users can search or drill down on the map to get the original files. Simple query views are similar to the interfaces of most of the Internet search engines offered (such as Yahoo, Excite and HotBot). It allows on-line users to query the Text Archive 81b for keywords or key phrases or search on different groups of textual information collected over time.

A typical user session using text-mining system 81 might follow the following steps. It is assumed that the user is connected to server 81e via the Internet and a web browser, as illustrated in FIG. 1. In the example of this description, server 81e is in communication with server 81c, which is implemented using ThemeScape software.

1. Compile list of data sources (Newsgroups, Discussion Groups, etc).
2. Start ThemeScape Publisher or comparable application.
3. Select "File".
4. Select "Map Manager" or comparable function.
5. Verify that server and email blocks are correctly set. If not, insert proper information.
6. Enter password.
7. Press "Connect" button
8. Select "New".
9. Enter a name for the new map.
10. If duplicating another maps settings, use drop down box to select the map name.
11. Select "Next".
12. Select "Add Source".
13. Enter a Source Description.
14. Source Type remains "World Wide Web (WWW)".
15. Enter the URL to the site to be mined.
16. Add additional URLs, if desired.
17. Set "Harvest Depth." Parameters range from 1 level to 20 levels.
18. Set "Filters" if appropriate. These include Extensions, Inclusions, Exclusions, Document Length and Rations.
19. Set Advanced Settings, if appropriate. These include Parsing Settings, Harvest Paths, Domains, and Security and their sub-settings.
20. Repeat steps 14 through 20 for each additional URL to be mined.
21. Select "Advanced Settings" if desired. These include Summarization Settings, Stopwords, and Punctuation.
22. Select "Finish" once ready to harvest the sites.
23. The software downloads and mines (collectively known as harvesting) the documents and creates a topographical map.
24. Once the map has been created, it can be opened and searched.

Text Mining Applied to Web Site Server Logs

The text mining concepts discussed above in connection with text mining system 81 can be applied to web site server logs.

Figure 10:
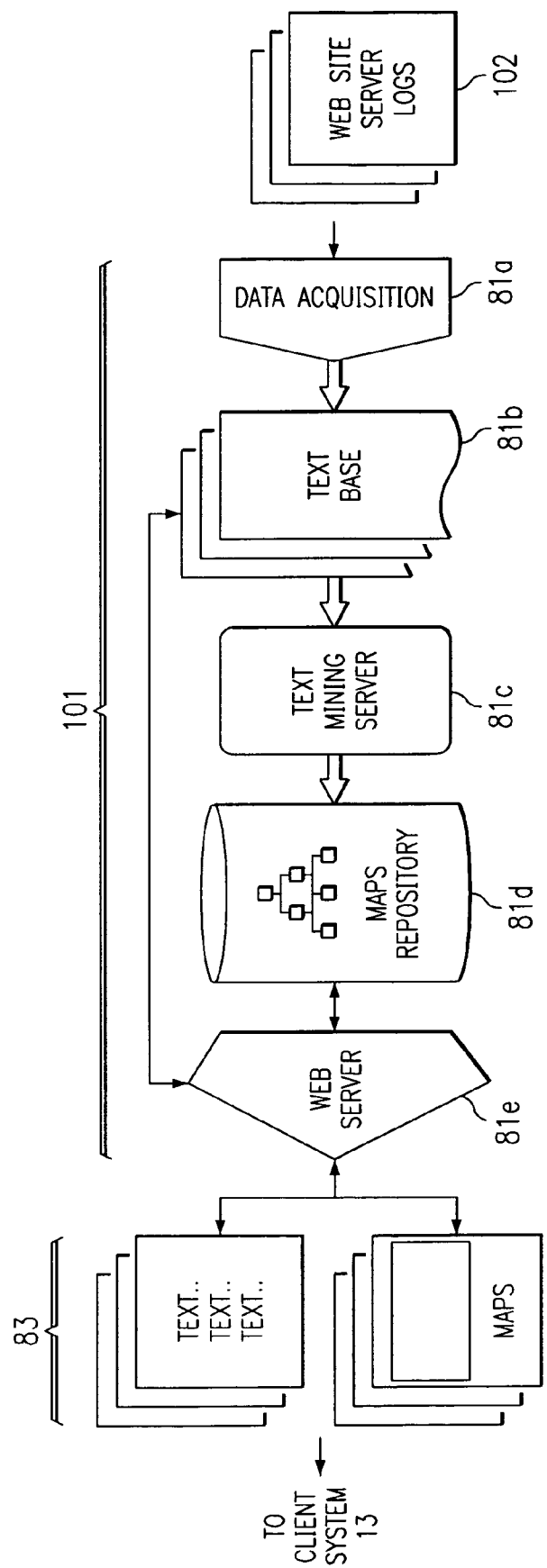
FIG. 10 illustrates a text mining system, similar to that of FIG. 8, applied to web site server logs.

FIG. 10 illustrates a text mining system 101 applied to web site server logs. Text mining system 101 is programmed to aggregate unstructured factual and contextual log entries for comparison to related content pages and processes occurring at the moment indicated by the log entry. This aggregated intelligence is then related to consummated and incomplete purchase transactions. Various predictive statistics are then extracted. These statistics include the most profitable aggregation clusters, the least profitable, the mean aggregation clusters, and dropped transaction aggregation clusters. The various aggregation clusters may be overlaid on transaction, survey, and user-entered demographics and preferences.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A text mining system for providing data representing Internet activities of a visitor to a web site of a business enterprise, comprising:
   a data acquisition process, operable to:
      extract visitor identification data from a server log of the web site, wherein the visitor identification data identifies a visitor to the web site at a known time;
      aggregate the visitor identification data with visitor purchase data to provide aggregated visitor data that represents whether a purchase was made from the website by the visitor at or near the known time;
      extract text documents from Internet-wide text sources, the Internet-wide text sources selected from the group of: newsgroups, discussion forums, and mailing lists to provide visitor related documents; and
      extract predictive statistics from the aggregated visitor data to provide extracted predictive statistics;
   a server, operable to:
      receive one or more queries, wherein each query of the one or more queries represents a request for information about the visitor and the visitor related documents; and
      provide responses to the one or more queries based on the received one or more queries and the aggregated visitor data, the extracted predictive statistics, and the visitor related documents;
   wherein the server is accessible via a web browser over the Internet.

2. The system of claim 1, wherein the text mining server is further operable to generate and store information maps representing the aggregated visitor data and the visitor related documents.

3. A text mining method for providing data representing Internet activities of a visitor to a website of a business enterprise, comprising:
   extracting visitor identification data from a server log of the web site, the data identifying a visitor to the website at a known time
   aggregating the visitor identification data with visitor purchase data to provide aggregated visitor data that represents whether a purchase was made from the website by the visitor at or near the same time; and
   extracting text documents from Internet-wide text sources other than the website, the Internet-wide text sources selected from the group of: newsgroups, discussion forums, and mailing lists to provide visitor related documents;
   extracting predictive statistics based on said extracting visitor identification data, said aggregating, and said extracting the text documents to provide extracted predictive statistics;
   receiving one or more queries, wherein each query of the one or more queries represents a request for information about the visitor and the visitor related documents;
   generating results based on the one or more queries and the aggregated visitor data, the extracted predictive statistics, and the visitor related documents; and
   storing the generated results.

4. The method of claim 3, further comprising:
   generating and storing information maps representing the aggregated visitor data and the visitor related documents.

5. A method, comprising:
   extracting visitor identification data from a server log of a website of an e-commerce client, wherein the visitor identification data identifies a visitor to the website at a known time;
   aggregating the visitor identification data with information related to at least one of web data or processes occurring at or near the known time to generate aggregated visitor data;
   determining whether the visitor purchased a product at or near the known time;
   storing information regarding the visitor and activity of the visitor based on said determining, operable to be provided to the e-commerce client; and
   extracting predictive statistics from the information regarding the visitor and the activity of the visitor to provide extracted predictive statistics, wherein the extracted predictive statistics are operable to be provided to the e-commerce client.

6. The method of claim 5, wherein the predictive statistics comprise one or more of:
   profitable aggregation clusters;
   least profitable aggregation clusters;
   mean aggregation clusters; and
   dropped transaction aggregation clusters.

7. The method of claim 5, further comprising:
   overlaying the statistics with one or more of transaction, survey, or user-entered demographics and preferences.

8. A method, comprising:
   extracting first information comprising visitor identification data from a server log of a website, wherein the visitor identification data identifies a visitor to the website at a known time;
   determining second information related to at least one of web data or processes corresponding to the visitor identification data and occurring at or near the known time, wherein the second information corresponds to activity of the visitor;
   determining third information regarding whether the visitor purchased a product at or near the known time;
   extracting predictive statistics based on the first information, the second information, and the third information to provide extracted predictive statistics;
   storing the first information comprising the visitor identification data, the second information comprising the activity of the visitor, the third information regarding visitor purchase in a memory, and the extracted predictive statistics;
   wherein the first, second, third information, and extracted predictive statistics are useable to evaluate the website.

9. The method of claim 8, further comprising:
providing the first, second and third information to a requesting entity associated with the website;
the requesting entity adjusting content of the website based on the first, second and third information.

10. A system, comprising:
a server log that stores information regarding visitors to a website;
at least one first server operable to:
  extract visitor identification data from the server log of the website, wherein the visitor identification data identifies a visitor to the website at a known time;
  determine first information related to at least one of web data or processes corresponding to the visitor identification data and occurring at or near the known time;
  determine whether the visitor purchased a product at or near the known time based on the visitor identification data and the first information; and
  extract predictive statistics based on information regarding the visitor and activity of the visitor to provide extracted predictive statistics;
wherein the at least one first server comprises a memory operable to store the visitor identification data, the first information, the extracted predictive statistics, and information regarding whether the visitor purchased a product at the known time;
wherein the at least one first server comprises a web server interface accessible by a client web browser to provide statistics regarding visitors to the website.

11. A computer readable memory medium storing program instructions executable by a processor to:
  extract first information comprising visitor identification data from a server log of a website, wherein the visitor identification data identifies a visitor to the website at a known time;
  determine second information related to at least one of web data or processes corresponding to the visitor identification data and occurring at or near the known time, wherein the second information corresponds to activity of the visitor;
  determine third information regarding whether the visitor purchased a product at or near the known time;
  store the first information comprising the visitor identification data, the second information comprising the activity of the visitor, and the third information regarding visitor purchase in a memory;
  wherein the first, second, and third information are useable to evaluate the website; and
  extract predictive statistics from at least one of the first, second, or third information to provide extracted predictive statistics, wherein the extracted predictive statistics are usable to evaluate the website.

12. The method of claim 11, wherein the predictive statistics comprise one or more of:
  profitable aggregation clusters;
  least profitable aggregation clusters;
  mean aggregation clusters; or
  dropped transaction aggregation clusters.

13. The method of claim 11, wherein the program instructions are further executable to:
  overlay the statistics with one or more of transaction, survey, or user-entered demographics and preferences.

14. The method of claim 11, wherein the program instructions are further executable to:
  extract unstructured text documents from unstructured Internet sources other than the website to provide visitor related documents.

15. The method of claim 11, wherein the unstructured Internet sources comprise one or more of:
  newsgroups;
  discussion forums; and
  mailing lists.

\* \* \* \* \*